Inventor
Best Pratt

Aug. 13, 1935. B. PRATT 2,011,343
TRIPLE VALVE FOR AIR BRAKE SYSTEMS
Filed Dec. 22, 1930   5 Sheets-Sheet 3

Inventor
Best Pratt
By [signature]
Attorneys

Aug. 13, 1935.  B. PRATT  2,011,343
TRIPLE VALVE FOR AIR BRAKE SYSTEMS
Filed Dec. 22, 1930   5 Sheets-Sheet 4

Inventor
Best Pratt

Aug. 13, 1935.  B. PRATT  2,011,343
TRIPLE VALVE FOR AIR BRAKE SYSTEMS
Filed Dec. 22, 1930    5 Sheets-Sheet 5

Inventor
Best Pratt

Patented Aug. 13, 1935

2,011,343

UNITED STATES PATENT OFFICE 2,011,343

TRIPLE VALVE FOR AIR BRAKE SYSTEMS

Best Pratt, Chicago, Ill., assignor to Brake Equipment & Supply Company, Chicago, Ill., a corporation of Illinois Application December 22, 1930, Serial No. 504,161

15 Claims. (Cl. 303—83)

The present invention relates to fluid pressure brakes and more especially to improvements in the construction and operation of the present "K" type triple valve.

Heretofore, it has been difficult to provide a fluid pressure brake capable of effectively preventing undesired emergency action, due to the fact that the various parts necessary to provide this action were incorporated in the triple valve and were operated by the parts which provide the usual service braking operation. The difference between the rate of brake pipe reduction to operate the triple valve piston, slide valve and other parts to a position to provide for service braking was so near to the rate of brake pipe reduction to provide for emergency braking that any derangement of parts, lack of lubrication or collection of dirt or other foreign matter caused the triple valve piston and slide valve to assume a position which resulted in emergency applications when a service application was desired.

In order to apply the brakes more uniformly on long trains, it has been found necessary to reduce the rate of build-up in the brake cylinder pressure, since the serial action in any emergency application will run through a 100 car train in approximately ten seconds.

An important object of the present invention consists in incorporating in a separate valve the means by which the brake pipe pressure is reduced in serial action at a sufficient rate an amount to insure the movement of the triple valve piston and slide valve to a position where the brake cylinder pressure will be obtained to a predetermined amount and at a predetermined rate of time.

A further object consists in the provision of means whereby the pressure in the brake cylinder is built up more slowly than on the present "K" type triple valves and the serial action accelerated, so that the brakes will be applied more uniformly and without any slack action.

Another object of the invention is to provide a quick service attachment for standard "K" type triple valves which may be readily and economically substituted for the usual emergency mechanism, said attachment being so constructed and arranged that the main or triple valve and its associated parts may be easily changed or redesigned, in order to co-act therewith in the operation of the brake equipment without the necessity of incorporating an entirely new triple valve mechanism.

A further object comprehends the provision of means for discontinuing the emergency feature in triple valves by blanking off the usual communication between the train pipe and the brake cylinder and incorporating the emergency feature in an independent vent valve, so as to provide means for preventing the emergency applications of the brakes only when required and in order that serial action in emergency applications may be obtained even after a full service application has been made.

A further object consists in the provision of a service measuring chamber or service reservoir which, in the present construction, is shown as a separate body to the main valve body of the triple valve and which, upon the actuation of the triple valve and its associated parts, is arranged to selectively communicate with the train pipe or the atmosphere, so that the service reservoir is cut off from communication with the brake pipe and put into communication with the atmosphere when the main or triple valve is in its normal and retarded release positions and is cut off from communication with the atmosphere and placed in communication with the train pipe when the triple valve is moved to a position for causing the brakes to be applied. The service reservoir is of predetermined size or capacity, so that the volume thereof is in exact accordance with the volume and length of the brake pipe on each car of the train, in order that a uniform and predetermined amount of brake pipe reduction will be effected at each chamber, when the main valve is moved to its service position, thus insuring a positive quick service application and eliminating the undesired emergency action typical to these types of valves.

Other objects and advantages of the invention will become apparent from the following description when taken in conjunction with the accompanying claims.

Referring to the drawings, in which is shown a preferred embodiment of the invention.

Figure 1:
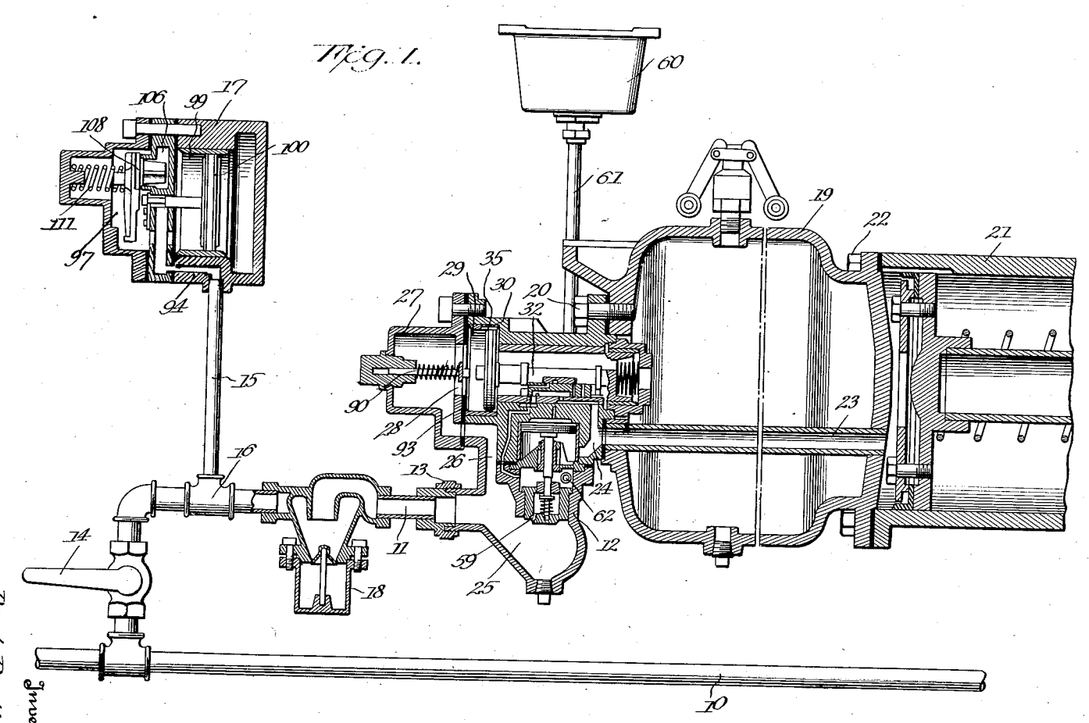
Figure 1 is a side elevational view with parts in section of the present "K" type triple system with the invention applied thereto.

Referring to the drawings, in which like numerals indicate like parts in the several views and more particularly Figure 1, 10 designates the train pipe which is locally connected to the brake equipment of each car by the brake pipe 11, which is connected to the standard "K" type triple valve body 12 by the coupling 13. An angle cock 14 may be provided for controlling the flow of the train pipe pressure through the brake pipe 11. A branch pipe 15 connected to the pipe 11 as at 16, communicates with an independent vent valve chamber 17. The train pipe may also be provided with the usual centrifugal dirt collector 18 for treating the air prior to its introduction into the triple valve casing 12.

The triple valve casing 12 may be connected to the auxiliary reservoir 19 by the bolts 20, while the brake cylinder 21 is attached to the auxiliary reservoir by the bolts 22 and may have the pipe 23 extending through the auxiliary reservoir to communicate with the passage 24 in the valve body.

Figures 2, 16:
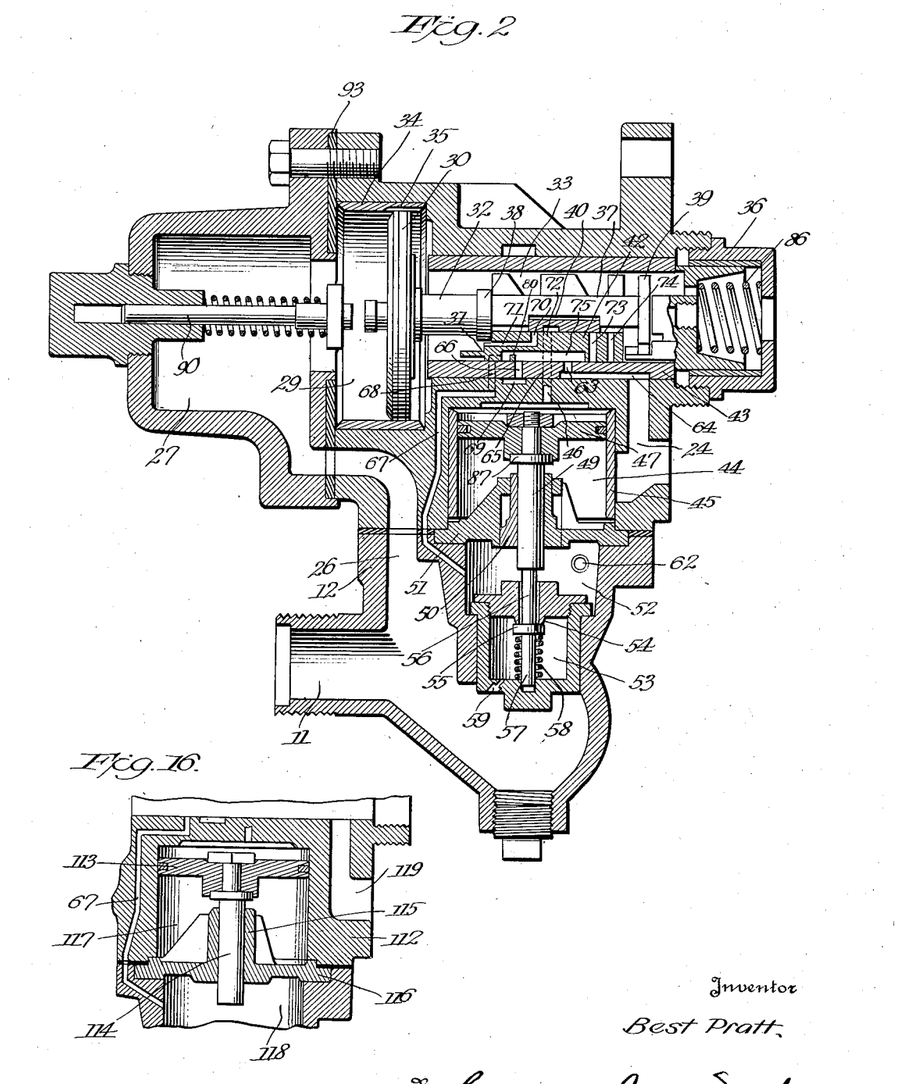
Figure 2 is an enlarged sectional view of the triple valve in its normal released position.
Figure 16 is a detail sectional view of a modified form of the invention.
Figure 3:
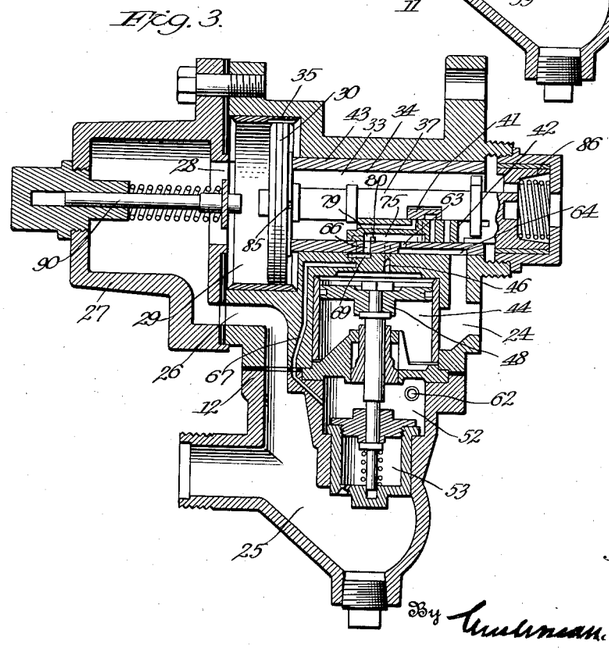
Figure 3 is a sectional view of the triple valve in its retarded released position.

Train pipe pressure is admitted into the triple valve and auxiliary reservoir from the chamber 25 through a passage 26 into the head or cap 27 and the opening 28, so as to empty into the piston chamber 29. Mounted in the chamber 29 is the triple valve piston 30 having its stem 32 (Fig. 2) extending into the slide valve chamber 33. The piston chamber 29 is provided with a bushing 34 having an axially disposed notch or groove 35 which, when the piston is in its retarded and normal release positions, as shown in Figures 2 and 3, allows the train pipe pressure to flow through the slidable valve chamber 33, yieldable stop housing 36 and into the auxiliary reservoir 19. When the pressures on both sides of the piston 30 are equalized, the system is then considered to be charged. The triple valve piston stem 32 has a reduced portion 37 positioned between the annular stop collar 38 and the end flanges or spaced arms 39 and this reduced portion is provided with a recess 40, which carries the graduating valve 41 that co-acts with the main slide valve 42 for moving the various ports and passages into and out of communication with one another during the operation of the triple valve. The main valve 42 is slidably mounted on a hollow valve seat 43 and is arranged to abut at its opposite ends the collar 38 and arms 39 respectively, so that upon movement of the valve stem 32 a limited distance relative to the main valve 42, the main valve will be moved bodily a predetermined distance in either direction with the graduating valve. The construction and operation of the foregoing parts are similar to the usual construction of the present "K" type triple valve now in general use and perform the usual functions in response to changes in train pipe pressure, the brakes being released and the auxiliary reservoir charged when pressure is admitted to or increased in the train pipe and the brakes being applied when the train pipe pressure is reduced; the train pipe pressure being under the control of the engineer by a suitable engineer's valve. In order that the movement of the main valve stem and its associated parts may be clearly understood they will be referred to as shown in the drawings.

In order to insure positive quick service application of the brakes and provide an equipment that gives an emergency application only when necessary, I have reorganized the standard triple valve construction in such a manner that these standard parts may be altered and used with my present attachment and the changes necessary may be economically effected at minimum expenditure of time and labor. Moreover, I have discontinued the emergency feature and have substituted therefor an attachment which may be readily installed or associated with the body of the triple valve. In discontinuing the emergency valve and its associated parts, I have modified the auxiliary chamber or the quick action piston chamber 44 positioned between the train pipe 11 and brake cylinder passage 24 by providing the chamber 44 with a bushing 45, so as to permanently blank communication between the train pipe and brake cylinder. The auxiliary chamber 44 communicates through a passage 46 with the slidable valve chamber 33 and auxiliary reservoir in a manner which will subsequently be described, and is provided with a service piston 47 having a depending boss 48, to which is connected a stem 49 that extends through a guide sleeve 50 carried by a closure member 51, that is fixedly secured to the valve body 12. The lower end of the stem 49 projects into a service chamber 52 that has mounted therein a poppet or vent valve chamber 53, that is provided with a valve seat opening 54 controlled by a valve 55 that has its stem 56 extending through the valve opening and into engagement with the adjacent aligned end of the piston stem 49, while its lower end portion 57 receives a coil spring 58 confined between the valve 55 and the bottom of the poppet valve casing, to normally urge the valve 55 into engagement with its seat 54. The stem 56 is of smaller diameter than the valve opening so as to form a clearance therebetween to permit the air to pass from the chamber 53 to the chamber 52 when the valve 55 is moved away from its seat. Train pipe pressure is conducted from the chamber 25 of the valve body through a restricted opening or passage 59 to the chamber 53.

In order to insure positive serial action in service application of the triple valves, there is provided a service reservoir or service measuring chamber 60 (Fig. 1) which communicates with the service chamber 52 through the pipe 61 as at 62. As shown, the service reservoir is independent of the main valve body, but, if desired, may be incorporated as a part of the main valve body.

The construction and operation of the triple valve is such that the service reservoir or service measuring chamber 60 is out of communication with the train pipe when the triple valve is in its released position, in which position it remains at intervals between successive applications of the brake. It will, therefore, be seen that when the service chamber 52, is placed in communication with the brake pipe 11, it increases the capacity of the brake pipe and allows the brake pipe air to assume a larger volume which proportionately reduces the train pipe pressure, causing a preponderance of pressure on the auxiliary reservoir side of the piston 30. The pressure in the train pipe and the service reservoir 60 quickly equalize and since the service reservoir is of a predetermined capacity, the amount of train pipe reduction in each car is definite and uniform throughout the train, the percentage of reduction depending upon the relation of the capacity of the service reservoir 60 to the proportional part of the brake pipe pertaining to the same car equipment. This drop in pressure in the brake pipe leaves the auxiliary reservoir pressure in preponderance, causing the movement of the triple valve and its associated parts to the left (Fig. 2).

Figure 11:
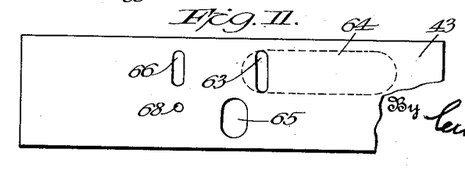
Figure 11 is a top plan view of the valve seat.

The valve seat 43 is provided with a through opening 63 (Fig. 11), which terminates in the bottom face of the valve seat in an elongated cavity 64 that communicates with the brake cylinder passage 24. An opening 65 in the valve seat registers with the passage 46 that leads from the service chamber 44 at a point above the piston 47 (Fig. 2). An opening 66 in the valve seat communicates with a passage 67 in the valve body that extends from the service chamber 52, while a restricted opening 68 in the valve seat communicates with an exhaust port 69 in the valve body that leads to the atmosphere.

In order that the various positions assumed by the triple valve and its associated parts may be clearly understood and as it is difficult to show, in sectional views, the various ports or passages that are moved into or out of registration in the different positions assumed by the triple valve, due to the fact that certain of these ports are in transverse alignment or slightly offset relative to one another, reference will be had to Figures 7 to 15 inclusive, to show the exact position of the various ports and cavities during the operation of the triple slide valve.

Figure 7:
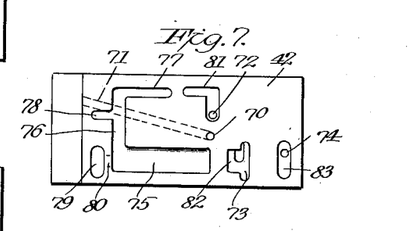
Figure 7 is a bottom plan view of the main slide valve.
Figure 8:
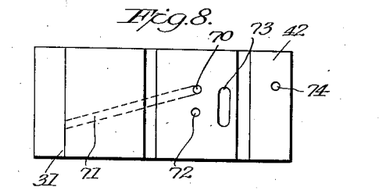
Figure 8 is a top plan view of the main slide valve.
Figure 9:
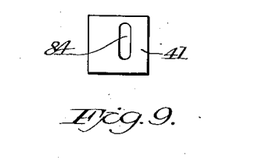
Figure 9 is a bottom plan view of the graduating valve.
Figure 10:
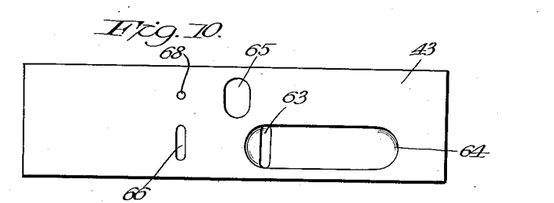
Figure 10 is a bottom plan view of the valve seat.

Referring to the main slide valve 42 and more particularly Figure 8, the top of the main valve is provided with a port 70 that communicates with a diagonally disposed longitudinal passage 71 that is drilled in the body of the slide valve and terminates in the end face 31 of the slide valve adjacent the collar 38, (Fig. 2). The top of the valve also has a through opening 72, an elongated transversely disposed opening 73 and a through opening 74, while the bottom face of the main valve 42, as shown in Figure 7, is provided with an elongated cavity 75, which extends parallel to one side thereof and has a transversely disposed branch cavity 76, which terminates in a longitudinally extending cavity 77 parallel to the cavity 75, but of lesser width and length. The transverse cavity 76 is also provided with a laterally offset cavity 78, while the cavity 75 at one end communicates with a cavity 79 by a reduced passage 80. The passage 72 terminates on the bottom face of the valve in a substantially L-shaped cavity 81, (Fig. 7), while the cavity 73 on the bottom face of the valve is formed with a longitudinal offset cavity 82. The opening 74 has the lower end thereof terminating in an elongated cavity 83. The graduating valve 41 in the bottom face thereof has a transversely disposed recess 84 arranged upon movement of the stem 32 to close and establish communication between the port 70 and the opening 72 and also to open and close the opening 73.

Retarded release position

Figure 12:
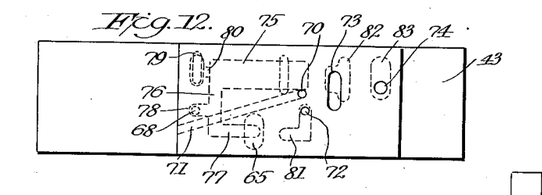
Figure 12 is a diagrammatic plan view showing the position of the slide valve and graduating valve relative to the slide valve seat, when the valve is in its "retarded release" position.

In order that the various positions assumed by the main valve 42 and graduating valve 41 relative to one another and to the ports in the valve seat when the triple valve piston 30 and its stem 32 are actuated, it will be first assumed that the triple valve piston 30 and its associated parts are in the retarded release position, as shown in Figures 3 and 12. In this position, compressed air from the train pipe passes from the chamber 25 and passage 26 in the valve body 12 into the head 27, through the opening 28 into the piston chamber 29, and past the feed groove 35. It will be noted that the piston 30 is moved into abutting engagement with the adjacent end of the slide valve seat 43, so as to restrict the flow of air from the train pipe into the slide valve chamber 33 and auxiliary reservoir 19. The inner face of the piston 30 adjacent its engagement with the valve seat 43 is provided with a groove 85, which allows a restricted flow of air to pass from the chamber 29 into the chamber 33. The graduating valve 41 and main slide valve 42 are carried by the valve stem 32 to the position as shown in Figure 3, in which position all the ports are blanked for the admission of the auxiliary reservoir air to the brake cylinder. The brake cylinder pressure is permitted to exhaust to the atmosphere through the port 24, which communicates with the cavity 64 on the underside of the slide valve 43, which, in turn, communicates through the opening 63 with the cavity 75 in the bottom of the slide valve 42 and is conducted through the restricted opening 80 to the cavity 79, that registers with the opening 66 in the valve seat, which communicates with the exhaust opening 69 in the valve body. Pressure is also exhausted from the chamber 44 above the piston 47 through the passage 46, which is in registration with the opening 65 in the valve seat 43, which, now registers with the cavity 77 in the bottom face of the slide valve 42, so that the air therefrom may be conducted through the restricted opening 80 to the cavity 79, which communicates through the opening 66 in the valve seat 43 with the exhaust port 69. At the same time, pressure from the service chamber 52 passes through the passage 67 to the opening 68, which is in registration with the offset cavity 78 in the bottom of the slide valve 42, so that the pressure in the service chamber 52 is conducted from the passage 76 through the restricted opening 80 and cavity 79 in the bottom face of the slide valve 42 to the opening 66 in the valve seat, which empties into the exhaust port 69 in the valve body.

It will be noted that in the retarded release position the exhaust of the brake cylinder pressure to the atmosphere is restricted through the relatively small port 80 in the slide valve, so as to prevent the brakes on the forward end of the train from releasing as readily as if the triple valve went to the normal release position and without compressing the retarded release spring 86. Also, in this position the feed groove 35 has not its full capacity due to the fact that the face of the piston 30 engages the adjacent end of the slide valve seat 43 and the auxiliary reservoir is restricted in its charging by the small port or groove 85 in the face of the triple valve piston 30.

Normal release position

Figure 13:
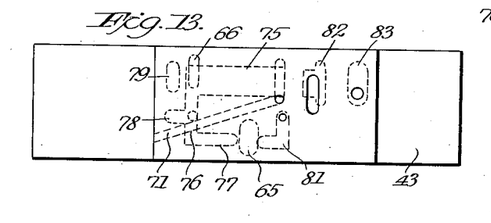
Figure 13 is a view similar to Figure 12 with the valve parts in their "normal release" position.

In this position, as shown in Figures 2 and 13, the retarded release spring 86 moves the slide valve to a position where the brake cylinder pressure is permitted to exhaust directly through the port 24, cavity 64, and opening 63 in the valve seat 43 that communicates with the cavity 75 which has been moved into registration with the opening 66 in the valve seat, and the exhaust 69. In this position, the auxiliary chamber or quick action piston chamber 44 above the piston 47 is also in communication with the atmosphere through the port 46, opening 65 in the valve seat, cavity 77 in the bottom face of the main valve 42 which communicates with the cavity 75 that empties through the opening 66 into the exhaust 69. The service chamber 52 is also opened to the atmosphere through the passage 67 and opening 68 that communicate with the transverse cavity 76 in the bottom face of the slide valve 42, which, in turn, empties into the cavity 75 that registers with the opening 66 that communicates with the exhaust port 69. It will be noted that in the retarded release position, the brake cylinder pressure, the pressure in the auxiliary chamber 44 and service chamber 52, empty into the exhaust through the cavity 79 in the bottom face of the slide valve 42, while in the normal release position the slide valve 42 has been moved a limited distance, so that the cavity 79 is closed from communication with the atmosphere and cavity 75 is moved into registration with the opening 66 that aligns with the exhaust cavity 69.

*Positive service position*

Figure 4:
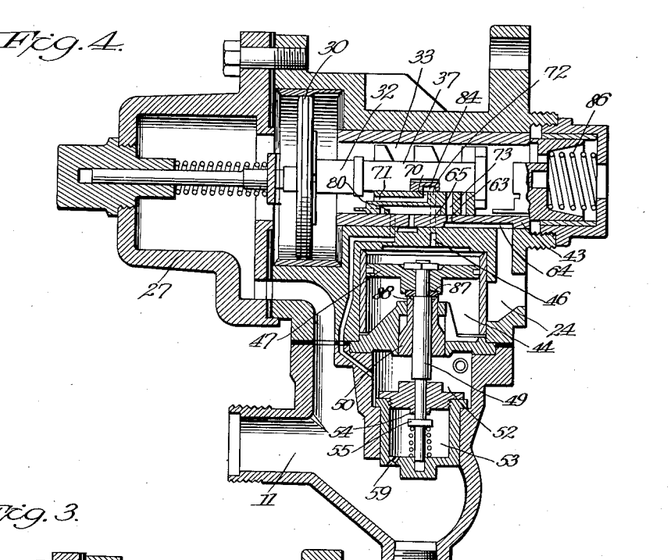
Figure 4 is a sectional view of the triple valve in its positive quick service position.
Figure 14:
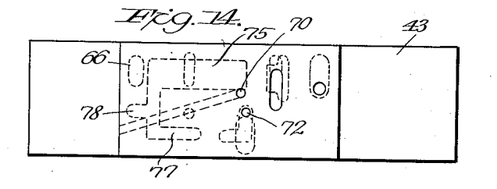
Figure 14 is a view similar to Figure 12 with the valve parts in their "service position".

Upon a reduction of train pipe pressure by the application of the engineer's valve, a preponderance of pressure is established on the slide valve chamber 33 side of the piston 30, which causes the triple valve piston and its associated parts to be moved to the position shown in Figure 4, with the main slide valve 42 and auxiliary valve 41 in register with the ports as more clearly disclosed in Figure 14. In this position, the initial movement of the piston 30 and its valve stem 32 towards the left causes the graduating valve 41 to be moved relative to the main slide valve 42, so that the cavity 84 in the bottom face of the graduating valve registers with the port 70 and opening 72, while the main slide valve has been moved relative to the slide valve seat 43 to bring the opening 72 into registration with the opening 65 in the slide valve seat, thus establishing communication between the slide valve chamber 33 in front of the piston 47 with the auxiliary chamber 44, through the longitudinal extending opening 71 in the slide valve 42, ports 70 and 72, which are connected through the cavity 84 on the graduating valve 41, the opening 65 in the valve seat with the passage 46 leading to the chamber 44, thus forcing the service piston 47 and its stem 49 downwardly which, in turn, moves the valve 55 away from its seat 54, thus permitting the train pipe pressure in the poppet valve chamber 53 to pass into the service chamber 52 from where it is conducted through the pipe 61 to the service reservoir 60. Since the volume of the quick service measuring chamber 60 is in exact accordance with the volume of the brake pipe on each car, pressure will be reduced immediately a sufficient amount to move promptly the piston 30 and its associated parts to the service position. The capacity of the port 59 in the poppet valve is of a predetermined size, so that the flow of air from the brake pipe to the service chamber 52 takes place in exactly the right time without interfering with the triple action of the emergency valve. Upon this positive drop in brake pipe pressure, the main slide valve 42 is carried to its service position permitting the air to pass from the auxiliary reservoir 19 and slidable valve chamber 33 to the brake cylinder 21 through the opening 73 in the main slide valve, which registers with the opening 63 in the valve seat 43 that communicates with the passage 24 leading to the brake cylinder through the cavity 64. It will be noted that in this position, the graduating valve 42 is moved away from the opening 73. When the pressure in the auxiliary reservoir is reduced slightly below that in the brake pipe, the piston 30 and the graduating valve 41 are moved to the right from the position, as shown in Figure 4, so that the graduating valve will blank the opening 73 in the main valve, thus cutting off the flow of air from the auxiliary reservoir to the brake cylinder. In order to prevent any loss of auxiliary reservoir air past the service piston 48, the piston stem 49 is provided with a rubber seat 87 arranged to form a joint, as at 88, with the adjacent end of the sleeve or bushing 50 when the triple valve is in this position, thus preventing the escape of any air from the auxiliary chamber 44 into the service chamber 52 and service measuring chamber 60 during the actuation of the service piston 47. It will be noted that by reason of the structural arrangement of parts, a positive reduction of brake pipe pressure is insured upon the initial movement of the graduating valve 41 and slide valve 42, which takes place slightly in advance of the opening of the port 73 in the slide valve which establishes communication between the auxiliary reservoir and the brake cylinder, thus insuring a positive movement of the triple valve piston 30 to its service position. The volume of the service chamber 60 is in exact accordance with the length and volume of the brake pipe on each car, so that a uniform and predetermined amount of brake pipe reduction takes place in each chamber as it is applied. The service chambers are preferably marked in accordance with the length of the brake pipe of the train.

It will be noted that in the reduction of brake pipe pressure in this manner, the serial action in service application of the triple valve will be materially decreased, so that the brakes on either a long passenger or freight train may be applied in service application before the slack is bunched, thus avoiding severe shocks to the running gear of the train, which is caused by unequal application of the brakes at the head and rear of the train.

*Emergency position*

Figure 5:
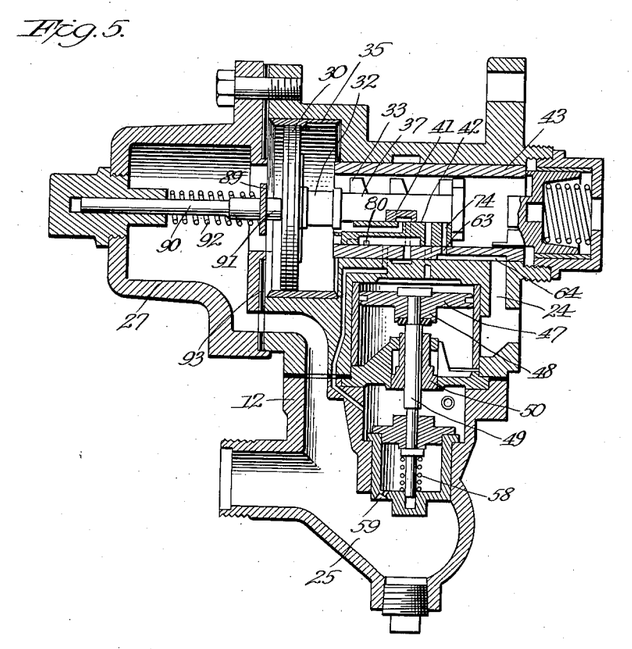
Figure 5 is a sectional view of the triple valve in its emergency position.
Figure 15:
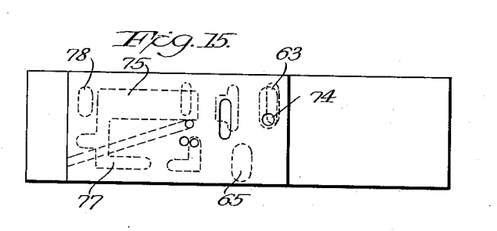
Figure 15 is a view similar to Figure 12 with the valve parts in their "emergency position".

The piston 30 is shown in the emergency position in Figures 5 and 15, in which position the main slide valve 42 and graduating valve 41 have been moved by the piston stem 32 to assume their extreme left position, due to the preponderance of pressure in the slide valve chamber 33 and auxiliary reservoir chamber, so that the end 89 of the graduating stem 90 in the head 27, is engaged by the adjacent abutment 91 of the piston and moved to the left against the tension of the spring 92, thus forcing the adjacent face of the piston 30 closely adjacent to the gasket 93. Of course, it is understood that when the piston 30 reaches its extreme left position, it engages the gasket 93. In this position, the slide valve 42 has been moved, so that the port 74 therein registers with the opening 63 in the valve seat, to establish communication between the auxiliary reservoir and the brake cylinder through the cavity 64, which immediately applies the brakes. In this position, the auxiliary reservoir pressure is allowed to equalize with the brake cylinder pressure, due to the fact that the slide valve 42 and piston 30 remain in this position, because the brake pipe pressure is depleted to zero, when an emergency application is made. The size of the port 74 and the slide valve 42 determines the rate of build up in the brake cylinder pressure and this port should be of such a size to permit the brake cylinder pressure building up, so that the slack will not run through the train.

Since the brake pipe pressure is reduced in advance of the movement of the slide valve, the brakes may be applied in service application, as fast or faster, than the slack will run on a long train. This is highly desirable as it has been found that the slack will run either in or out at slow speeds in approximately seven seconds with a 100 car train.

Vent valve operation

Figure 6:
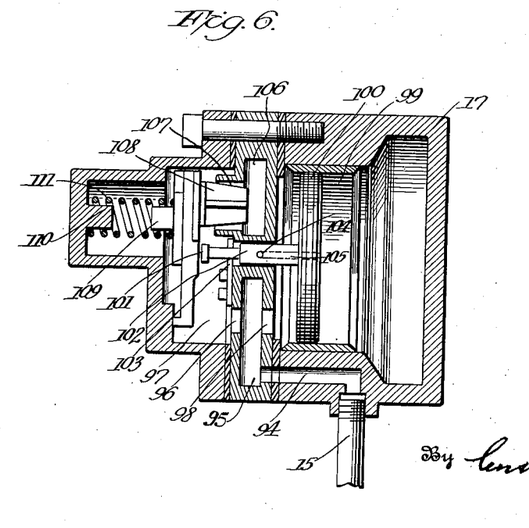
Figure 6 is an enlarged sectional view of the vent valve mechanism.

As the brake pipe pressure builds up in the pipe 11, it flows through the pipe 15 into the vent valve chamber 17 through the passage 94 (Fig. 6), into a chamber 95 that communicates through the opening 96 with chamber 97 and through the opening 98 with chamber 99, so as to impinge upon the left face of the vent piston 100 and force the same to the right until the head 101 on the piston stem 102 engages the stop plate 103. The vent piston 100 is then in its full release position and the pressure in chamber 99 on opposite sides of the piston 100 is allowed to equalize by means of the radial opening 104 in the stem 102, which communicates with the axial opening 105, that extends to the exposed right end or face of the piston 99. The exhaust chamber 106 in the vent valve casing 17 communicates with the chamber 97 through the valve seat passage 107, which passage is normally closed by the vent valve 108, which has a stud 109 between which and the opposed wall 110 is confined a coil spring 111 for yieldably maintaining the valve 108 in its closed position. Upon a sudden or heavy reduction of pressure in the brake pipe 11, the drop in pressure in chamber 97 will cause a preponderance of pressure in the chamber 99 on the right face of the valve 100. The greater pressure on the right face of the piston 100 will force the stem 102 to the left against the tension of spring 111 compressing the latter and moving the vent valve 108 away from its seat, so as to establish communication between the train pipe pressure and the exhaust 106, thus depleting the brake pipe pressure and causing an instantaneous and simultaneous application of the brakes throughout the train. As the pressure equalizes in the chamber 99 on opposite sides of the piston 100 through the ports 104 and 105, such equalization destroys the resistance to the spring 111, so that the latter, upon overcoming this pressure, forces the vent valve 108 to its seat, closing communication through the exhaust 106 and the atmosphere.

It will be observed that my improved attachment may be readily connected to the present "K" type triple valves with slight alteration to the triple valve and its associated parts and is arranged to supplant the ordinary emergency valve usually employed with this type of valve construction. Moreover, by discontinuing the emergency feature of the standard "K" type triple valves and incorporating it in an independent vent valve, serial action in emergency applications may be obtained even after a full service application has been made. Additionally, by reason of the present invention, a simple, efficient and economical attachment is provided that may be installed on the present type of triple valves for venting brake pipe air pressure locally into a predetermined size service reservoir, whereby the attachment and ports governed by the actuation of the triple valve co-act to cut off communication of the service reservoir with the brake pipe and put it in communication with the atmosphere when the triple valve is in its normal and retarded release positions and cut off communication with the atmosphere and place the service reservoir in communication with the train pipe when the triple valve is moved to a position for causing the brakes to be applied and whereby the auxiliary reservoir is placed in communication with the brake cylinder after communication has been established between the brake pipe and the service reservoir. Moreover, the triple valve and its associated parts are so constructed and arranged that the brakes are applied in service application faster than in emergency application. In other words, the escape of air from the auxiliary reservoir to the brake cylinder is so regulated as to avoid or preclude the emergency application of the brakes when the triple valve and its associated parts are moved to service position to apply the brakes.

Instead of altering the emergency chamber of the standard "K" type triple valve to accommodate the service piston 47 and its associated parts, the same may be positioned in a separate casing 112 (Fig. 16). This form of the invention is substantially similar in construction and operation to the parts previously described with the exception that the service piston 113 has its stem 114 extending through a hollow boss or sleeve 115, that is preferably formed integral with the closure member 116 that separates the auxiliary chamber 117 from the service chamber 118. Additionally, the casing may be provided with a passage 119 arranged to selectively establish communication between the auxiliary reservoir and the brake cylinder during the operation of the main valve.

It is to be understood that the forms of invention shown and described are merely illustrative of preferred embodiments and that such changes as fall within the purview of one skilled in the art may be made without departing from the spirit of the invention and the scope of the appended claims.

What I claim is:

1. In a triple valve having a piston actuated by variation in train pipe pressure, a device supplanting the usual emergency mechanism to produce a positive quick service application comprising an auxiliary chamber having a bushing for closing communication between the train pipe and the brake cylinder, a service chamber beneath said auxiliary chamber, a piston in said auxiliary chamber having its stem extending into said service chamber, a poppet valve chamber communicating with the train pipe and provided with a valve seat for controlling communication between the same and the service chamber, a movable valve for said seat, said poppet valve having its stem extending upwardly into said service chamber and into engagement with the stem of said piston, means for normally urging said poppet valve into engagement with its seat, a service reservoir communicating with said service chamber, and means operable by the triple valve whereby the service reservoir is cut off from communication with the brake pipe and put in communication with the atmosphere when the triple valve is in its retarded and normal release positions, and placed in communication with the train pipe and cut off from the atmosphere when the triple valve is moved to a position to apply the brakes.

2. In a triple valve having a piston actuated by variation in train pipe pressure, a device supplanting the usual emergency mechanism to produce a positive quick service application comprising an auxiliary chamber, a service chamber and a poppet valve chamber, said poppet valve chamber communicating with the train pipe, a service reservoir communicating with said service chamber and means operable by the triple valve whereby the service reservoir is cut off from communication with the brake pipe and put in communication with the atmosphere when the triple valve is in its retarded and normal release positions, and placed in communication with the train pipe and cut off from the atmosphere when the triple valve is moved to a position for causing the brakes to be applied.

3. A device to be applied to triple valves to produce quick service application having a fixed bushing in the quick action piston chamber for permanently closing the usual communication between said chamber and the brake cylinder, a service measuring chamber arranged to selectively communicate with the train pipe and the atmosphere, said device having a valve for controlling the supply from the train pipe to the service measuring chamber, said quick action piston chamber having a reciprocating piston provided with a stem for controlling said valve, and means operable by the triple valve whereby the service measuring chamber is cut off from communication with the brake pipe and put into communication with the atmosphere when the triple valve is in its retarded and normal release position, and placed in communication with the train pipe and cut off from the atmosphere when the triple valve is moved to a position for causing the brake to be applied.

4. A device to be applied to triple valves for supplanting the usual emergency mechanism to produce a positive quick service application comprising an auxiliary chamber interposed between the passage communicating the train pipe with the brake cylinder, a bushing in said chamber for closing communication between the train pipe and the brake cylinder, means communicating the auxiliary chamber with the auxiliary reservoir, a service chamber beneath said auxiliary chamber, a piston in said auxiliary chamber having its stem extending into said service chamber, a poppet valve controlling the supply of train pipe pressure to the service chamber, a service reservoir communicating with the service chamber, and means operable by the triple valve for causing the actuation of the piston, whereby the service reservoir is cut off from communication with the brake pipe and put in communication with the atmosphere when the triple valve is in its retarded and normal release positions, and placed in communication with the train pipe and cut off from the atmosphere when the triple valve is moved to a position for causing the brakes to be applied.

5. A device to be applied to triple valves for supplanting the usual emergency mechanism to produce a positive quick service application comprising an auxiliary chamber interposed between the passage normally establishing communication between the train pipe and the brake cylinder, means in said chamber for closing communication between the train pipe and the brake cylinder, means communicating the auxiliary chamber with the auxiliary reservoir, a service chamber associated with said auxiliary chamber, a poppet valve for controlling the flow of pressure from the train pipe to the service chamber, and means in said auxiliary reservoir and operatively connected to said poppet valve, whereby the service reservoir is cut off from communication with the brake pipe and put in communication with the atmosphere when the triple valve is in its retarded and normal release positions, and placed in communication with the train pipe and cut off from the atmosphere when the triple valve is moved to a position for causing the brakes to be applied.

6. In a triple valve having a piston actuated by variation in train pipe pressure, a device supplanting the usual emergency mechanism to produce a positive quick service application comprising an auxiliary chamber positioned between the train pipe and the brake cylinder and communicating with the triple valve chamber, a bushing in said auxiliary chamber permanently blanking communication between the train pipe and brake cylinder, a service piston in said auxiliary chamber responsive to the pressure in the triple valve chamber, a service chamber, a closure member having a medially disposed tubular sleeve for establishing communication between said auxiliary chamber and said service chamber, said service piston having a depending stem extending through said sleeve into said service chamber and provided with a seat for engagement with the adjacent surface of said sleeve, a poppet valve casing communicating with said service chamber and provided with a valve seat, a vent valve co-acting with said valve seat for controlling the pressure supply from the poppet valve to the service chamber, said poppet valve having its stem extending through said seat and into engagement with said service piston stem, yieldable means normally maintaining said poppet valve in engagement with its seat, means communicating the poppet valve with the train pipe pressure, a service reservoir communicating with the service chamber, and means operable by the triple valve for actuating said service piston and said check valve, whereby the service reservoir is cut off from communication with the brake pipe and put in communication with the atmosphere when the triple valve is in its retarded and normal release positions, and placed in communication with the train pipe and cut off from the atmosphere when the triple valve is moved to position to apply the brakes.

7. In a triple valve having a piston actuated by variation in train pipe pressure, a device substituted for the usual emergency mechanism to produce a positive quick service application comprising a hollow member interposed between the train pipe and the brake cylinder and permanently blanking communication between the train pipe and brake cylinder, a service reservoir arranged to communicate selectively with the train pipe and the atmosphere, and means in said hollow member and responsive to the pressure in the auxiliary reservoir for controlling the flow of the train pipe pressure to the service reservoir whereby the service reservoir is cut off from communication with the brake pipe and put in communication with the atmosphere when the triple valve is in its retarded and normal release positions, and placed in communication with the train pipe and cut off from the atmosphere when the triple valve is moved to a position to apply the brakes.

8. A device for triple valves arranged to supplant the usual emergency mechanism comprising a hollow member applied to the body of the triple valve, a service reservoir communicating with said hollow member and arranged to communicate with the train pipe and the atmosphere, said hollow member having movable means therein operable by the pressure in the auxiliary reservoir for communicating the service reservoir with the atmosphere and cutting off its communication with the brake pipe when the triple valve is in its retarded and normal release positions, and placing the service reservoir in communication with the train pipe and cutting off its communication with the atmosphere when the triple valve has moved to a position to apply the brakes.

9. In combination with a triple valve having a triple valve piston actuated by variation in train pipe pressure, a hollow member forming part of the valve body and communicating with the auxiliary reservoir, said member positioned in the passage normally communicating the train pipe with the brake cylinder, and permanently blanking communication therebetween, a service reservoir adapted to communicate with the train pipe and the atmosphere, means in said hollow member and actuated by the triple valve piston for placing the service reservoir in communication with the atmosphere and cutting off communication with the brake pipe when the triple valve is in its retarded and normal released positions and placing it in communication with the train pipe and cutting off communication with the atmosphere when the triple valve is moved to its brake applied position, and means when the triple valve piston is in its retarded release position for restricting the flow of pressure from the train pipe to the auxiliary reservoir.

10. In combination with a triple valve, a hollow member forming part of the valve body and communicating with the auxiliary reservoir, said member positioned in the passage normally communicating the train pipe with the brake cylinder, and permanently blanking communication therebetween, a service reservoir adapted to communicate with the train pipe and the atmosphere, a service piston mounted in said hollow member and responsive to the pressure in the slidable valve chamber, a poppet valve for controlling admission of train pipe pressure to the service reservoir, and means operatively connecting said service piston to said poppet valve whereby the service reservoir is cut off from communication with the brake pipe and put in communication with the atmosphere when the triple valve is in its restricted and normal release positions, and placed in communication with the train pipe and cut off from the atmosphere when the triple valve is moved to a position for causing the brakes to be applied, and means when the triple valve is in its retarded release position for restricting the flow of air to the auxiliary reservoir.

11. In a triple valve having a piston actuated by variation in train pipe pressure, an auxiliary chamber positioned between the train pipe passage and the brake cylinder passage, means for closing communication between said passages, a service piston in said auxiliary chamber, means for communicating the service chamber with the auxiliary reservoir for actuating the piston, a service chamber positioned beneath said auxiliary chamber, a closure member having a medially disposed tubular boss, a sleeve mounted in said boss, a poppet valve associated with said service chamber for controlling the passage of air from the train pipe to the said service chamber, said poppet valve having its stem extended into said chamber, said service piston having a depending stem extending through said sleeve and into engagement with the poppet valve stem and means upon the triple valve being moved to its service position to cause the actuation of the piston to permit train pipe pressure to pass into the service chamber.

12. In a triple valve having a piston actuated by variation in train pipe pressure, an auxiliary reservoir, a quick acting piston chamber adapted to communicate with the auxiliary reservoir and having a reciprocating piston operable by the auxiliary reservoir pressure, a service chamber, and a poppet valve chamber in constant communication with the train pipe through a restricted opening, said poppet valve chamber having a valve for controlling communication with said service chamber, said valve being operatively connected to said reciprocating piston to be actuated thereby and establish communication between the train pipe and the service chamber when the triple valve is in its service position.

13. A device to be applied to triple valves to produce quick service application including a quick action piston chamber having an insertable fixed bushing for permanently closing the usual communication between said chamber and the brake cylinder, a service measuring chamber arranged to communicate selectively with the train pipe and the atmosphere, and means in said quick action piston chamber operable by the triple valve for communicating the service measuring chamber with the train pipe.

14. A device to be applied to triple valves to produce quick service application including a quick action piston chamber having an insertable fixed bushing for permanently closing the usual communication between said chamber and the brake cylinder, a service reservoir associated with the quick action piston chamber and arranged to communicate with the train pipe and the atmosphere, a valve for controlling the flow of the fluid from the train pipe to the service reservoir, and means in said quick action piston chamber operable by the triple valve for actuating said valve.

15. A device to be applied to triple valves to produce quick service application including a quick action piston chamber having an insertable fixed bushing for permanently closing the usual communication between said chamber and the brake cylinder, a service reservoir arranged to communicate with the train pipe and the atmosphere, a valve casing associated with the service reservoir and communicating with the train pipe, a valve in said valve casing for conducting the fluid from the train pipe to the service reservoir, and means in said quick action piston chamber operable by the triple valve for actuating said valve to control the flow of the fluid from the train pipe to the service reservoir.

BEST PRATT.